US011414609B2

(12) United States Patent
Ackerson et al.

(10) Patent No.: US 11,414,609 B2
(45) Date of Patent: Aug. 16, 2022

(54) SYSTEM FOR TREATING RENEWABLE FEEDSTOCKS

(71) Applicant: Duke Technologies, LLC, Fayetteville, AR (US)

(72) Inventors: Michael D. Ackerson, Fayetteville, AR (US); Michael Steven Byars, Fayetteville, AR (US); Kyle Ackerson, Prairie Grove, AR (US); John Coleman, Lowell, AR (US)

(73) Assignee: Duke Technologies, LLC, Fayetteville, AR (US)

( * ) Notice: Subject to any disclaimer, the term of this patent is extended or adjusted under 35 U.S.C. 154(b) by 0 days.

(21) Appl. No.: 17/647,288

(22) Filed: Jan. 6, 2022

(65) Prior Publication Data

US 2022/0127536 A1   Apr. 28, 2022

Related U.S. Application Data

(62) Division of application No. 17/362,616, filed on Jun. 29, 2021, now Pat. No. 11,254,883.

(60) Provisional application No. 63/046,149, filed on Jun. 30, 2020.

(51) Int. Cl.
  *C10G 69/02*  (2006.01)
  *C10G 3/00*  (2006.01)
  *B01D 17/02*  (2006.01)
  *B01D 19/00*  (2006.01)

(52) U.S. Cl.
  CPC ......... *C10G 69/02* (2013.01); *B01D 17/0214* (2013.01); *B01D 19/0005* (2013.01); *C10G 3/40* (2013.01); *C10G 2300/1003* (2013.01); *C10G 2300/1011* (2013.01); *C10G 2300/202* (2013.01); *C10G 2300/205* (2013.01); *C10G 2300/302* (2013.01); *C10G 2300/308* (2013.01); *C10G 2300/4006* (2013.01); *C10G 2300/4018* (2013.01); *C10G 2400/04* (2013.01)

(58) Field of Classification Search
  CPC .............................................. B01J 2219/00006
  See application file for complete search history.

(56) References Cited

U.S. PATENT DOCUMENTS

| 8,280,795 | B2 | 10/2012 | Rhodes, III |
| 9,096,804 | B2 | 8/2015 | Ackerson et al. |
| 9,159,105 | B2 | 10/2015 | Keith et al. |
| 9,828,552 | B1 | 11/2017 | Ackerson et al. |
| 10,487,268 | B2 | 11/2019 | Ackerson et al. |
| 10,557,338 | B2 | 2/2020 | Rhodes et al. |
| 10,961,463 | B2 | 3/2021 | Ackerson et al. |
| 10,981,142 | B2 | 4/2021 | Ackerson et al. |
| 2007/0135669 | A1* | 6/2007 | Koivusalmi ............ C07C 9/22 585/16 |
| 2011/0226603 | A1 | 9/2011 | Peus |
| 2013/0144091 | A1 | 6/2013 | Pensare et al. |
| 2014/0109465 | A1 | 4/2014 | Coppola et al. |
| 2015/0041305 | A1 | 2/2015 | Overheul et al. |
| 2015/0126787 | A1 | 5/2015 | Gruber et al. |
| 2019/0338205 | A1 | 11/2019 | Ackerson et al. |
| 2020/0087577 | A1 | 3/2020 | Ackerson et al. |

FOREIGN PATENT DOCUMENTS

| CN | 104745310 A | 7/2015 |
| CN | 104962397 A | 10/2015 |
| JP | 5968099 B2 | 8/2016 |
| WO | WO2014131087 A1 | 9/2014 |
| WO | WO2018075017 A1 | 4/2018 |
| WO | WO2019229037 A1 | 12/2019 |
| WO | WO2019229072 A1 | 12/2019 |
| WO | WO2020007790 A1 | 1/2020 |
| WO | WO2020252290 A1 | 12/2020 |

OTHER PUBLICATIONS

California Air Resources Board, Low Carbon Fuel Fuel Standard, accessed Jun. 8, 2021, pp. 1-35.
California Air Resources Board, Low Carbon Fuel Standard (LCFS) Guidance 20-04, Apr. 2020, pp. 1-5.
International Search Report (ISR) and Written Opinion of the International Searching Authority (WO/ISA) dated Dec. 6, 2021 in counterpart International PCT Application No. PCT/US2021/039767.

* cited by examiner

*Primary Examiner* — Randy Boyer
(74) *Attorney, Agent, or Firm* — Grady K. Bergen; Griggs Bergen LLP

(57) ABSTRACT

A system that includes a feedstock of a non-petroleum or renewable feedstock containing oxygen and contaminants of one or more of metals, gums, and resins that is introduced into the reactor at a flow velocity of from 20 ft/sec to 100 ft/sec. The feedstock is heated within the reactor to a temperature of from 700° F. to 1100° F. to remove and/or reduce the content of one or more of gums and resins in the fats and/or oils of the feedstock. The system further includes a reactor product that is formed in the reactor from the feedstock that has the one or more of gums and resins in the fats and/or oils of the feedstock removed and/or reduced and a heat exchanger to cool the reactor product. A separator unit separates and removes non-condensable gases, metals and water from the cooled reactor product. A final product of the system is separated from the non-condensable gases, metals and water from the cooled reactor product. The final product has an oxygen content that is 60% or less of that of the feedstock, and wherein the final product comprises 25 wt % or less of any triglycerides, monoglycerides, diglycerides, free fatty acids, phosphatides, sterols, tocopherols, tocotrienols, and fatty alcohols, from 5 wt % to 30 wt % naphtha, and 50 wt % or more diesel.

20 Claims, 2 Drawing Sheets

SYSTEM FOR TREATING RENEWABLE FEEDSTOCKS

CROSS-REFERENCE TO RELATED APPLICATIONS

This application is a division of U.S. patent application Ser. No. 17/362,616, filed Jun. 29, 2021, which claims the benefit of U.S. Provisional Patent Application No. 63/046,149, filed Jun. 30, 2020, each of which is hereby incorporated by reference in its entirety for all purposes.

BACKGROUND

Renewable diesel feedstocks, such as distillers corn oil, fancy bleachable tallow, used cooking oil, etc., which have not been pretreated, contain many components that are detrimental to hydroprocessing reactors or units for producing renewable diesel, as well as other products. These components cause serious plugging problems within the reactors used for forming renewable diesel. As a result, nearly all feedstocks must be pretreated prior to processing into renewable diesel.

Conventional pretreatment processes for renewable diesel feedstocks typically require two stages of pretreatment. The first stage utilizes centrifuges to remove gums and resins by adding water and then centrifuging out the "hydratable" gums. This is followed by an acid wash and centrifugation to remove the "non-hydratable" gums. In the second stage, "bleaching" is used to remove metals and color bodies by "filtering" through an adsorbent. The "spent" adsorbent must be regenerated or disposed in a land fill. In addition to the solid waste material that must be disposed, the process is both labor and capital intensive. Additionally, such pretreatment processes do not address the high oxygen content typically present in the feedstock.

Once the renewable diesel feedstocks are pretreated, the pretreated feedstock is hydrotreated in a renewable diesel unit. Renewable diesel units are typically built for severe operation, operating at high pressures (e.g., 900 psi or more) with a high heat release. This increases the construction costs of the renewable diesel plant, as plants configured for higher operating pressures cost more than those that operate at lower pressures. Conventional renewable diesel units also have a high hydrogen demand. This is due to the high oxygen content (e.g., 10% or more) of conventional renewable diesel feedstocks. The hydrogen reacts with the oxygen of the renewable diesel feedstocks to form water. Water can be especially harmful to the hydroprocessing catalyst of the renewable diesel unit. Water can deactivate the catalyst as well as reduce hydrogen solubility, significantly reducing the overall productivity of the unit.

Additionally, even with hydrotreating, a large amount of waxes or n-paraffins are contained in the hydrotreated product resulting in the hydrotreated product having a very high pour point (e.g., a pour point of 70° F.). A high pour point may make the renewable diesel unsuitable for use in colder climates. The hydrotreated product is therefore typically isomerized to reduce the amount of n-paraffins to form iso-paraffins to lower the pour point of the renewable diesel product to the desired level.

In recent years, much emphasis has been placed on the greenhouse gases produced by burning particular fuels. This not only includes the amount of greenhouse gases that are produced by merely burning the fuels themselves, but also in the amount of greenhouse gases (GHG) that are produced in the fuels' production and supply. This evaluation is often referred to as life-cycle assessment (LCA), which is the methodology for assessing the environmental impacts of commercial products or processes. Standards, such as the U.S EPA's revised National Renewable Fuel Standard (RFS2) and California's Low Carbon Fuel Standard (LCFS) have been implemented in an effort to lowering GHG emissions. These standards are expressed in terms of the carbon dioxide emission intensity or carbon intensity (CI) score or value of a particular fuel. The CI is measured in units of grams of $CO_2$ emissions ($CO_2e$) per megajoule of fuel (i.e., $gCO_2e/MJ$ or g/MJ). As an example, conventional petroleum diesel may have a CI of 100 g/MJ or more. In contrast, renewable diesel may have a CI of around 20 g/MJ. While the CI value of conventional renewable diesel is much lower than for petroleum diesel, lowering the CI value even further is beneficial. Lowering the CI value of renewable diesel not only lowers the GHG emissions associated with the fuel, but a higher monetary value may also be placed on those fuels with lower CI scores, making their production more profitable.

Accordingly, improvements in treating renewable diesel feedstocks and in producing renewable diesel fuels are needed to overcome the current shortcomings encountered with respect to these materials and their processing.

BRIEF DESCRIPTION OF THE FIGURES

For a more complete understanding of particular embodiments of the invention, and the advantages thereof, reference is now made to the following descriptions taken in conjunction with the accompanying figures, in which.

DETAILED DESCRIPTION

Figure 1:
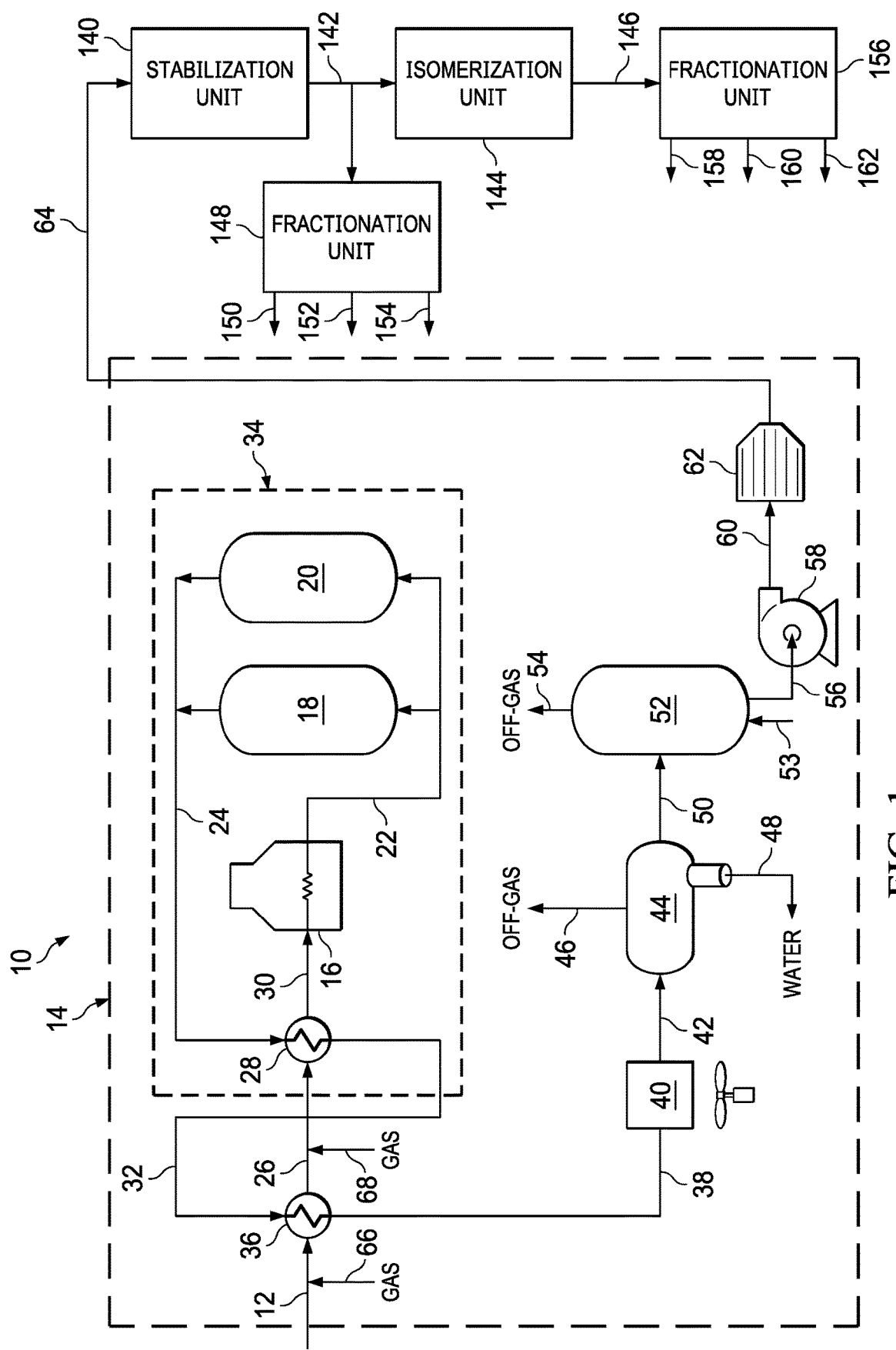
FIG. 1 is a schematic flow diagram of a treatment system for treating a feedstock of animal-derived and/or plant-derived fats and/or oils.

In the present invention, a treatment process for treating a feedstock of non-petroleum or renewable feedstocks derived from biological sources containing oxygen and contaminants of one or more of metals, gums, and resins is used to produce higher value products, such as renewable diesel fuel. The feedstocks are typically animal-derived and/or plant-derived fats and oils. Such fats and oils are primarily composed of triglycerides, along with minor amounts of mono- and diglycerides, free fatty acids, phosphatides, sterols, tocopherols and tocotrienols, and fatty alcohols. These fats and oils can be used for renewable diesel feedstocks as well as feedstocks for other products. Sources of such feedstocks may include, but are not limited to, distillers corn oil, fancy bleachable tallow, used cooking oil, animal fat, plant-derived oils, etc. The feedstocks may also include pyrolysis oils, such as those derived from cellulosic materials, which typically have a very high oxygen content, as well as other oils having a high metal and/or oxygen content.

In certain embodiments, the non-petroleum or renewable feedstocks may have at least one or more of triglycerides, monoglycerides, diglycerides, free fatty acids, phosphatides, sterols, tocopherols and tocotrienols, and fatty alcohols in an amount of 50 wt %, 55 wt %, 60 wt %, 65 wt %, 70 wt %, 80 wt %, 85 wt %, 90 wt %, and 95 wt % or more by total weight of the feedstock. These are all oxygen-containing compounds that may be found in animal-derived and/or plant-derived fats and oils. Most of the feedstock will be triglycerides, which may be as high as 95 wt % or more by total weight of the feedstock. In certain embodiments, the total triglycerides, monoglycerides, diglycerides, free fatty acids, phosphatides, sterols, tocopherols and tocotrienols, and fatty alcohols may be present in the feedstock from at least, equal to, and/or between any two of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 92 wt %, 93 wt %, 94 wt %, 95 wt %, 96 wt %, 97 wt %, 98 wt %, and 99 wt % by total weight of the feedstock.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventors appreciate and understand that any and all points within the range are to be considered to have been specified, and that inventors possess the entire range and all points within the range.

Compared to petroleum, these non-petroleum or renewable feedstocks typically have a high oxygen content. In many instances, the oxygen content of the feedstock can be from 8 wt % or more by total weight of the feedstock. In certain embodiments, the oxygen content may be present in the feedstock in an amount from at least, equal to, and/or between any two of 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, and 40 wt %, 41 wt %, 42 wt %, 43 wt %, 44 wt %, 45 wt %, 46 wt %, 47 wt %, 48 wt %, 49 wt %, and 50 wt % by total weight of the feedstock. As discussed earlier, during hydroprocessing or hydrotreating, the oxygen of the feedstocks reacts with hydrogen to form water. This water can be detrimental to the renewable diesel or hydroprocessing reactors and catalysts, as well as reduce hydrogen solubility.

The non-petroleum or renewable feedstocks may also contain undesirable materials or "contaminants," such as metals, gums and resins, which may cause serious plugging or other problems within the reactors or processing equipment. These materials may be naturally occurring in the initially formed fats and oils or may be formed or added during their later use or processing and prior to their use as a renewable feedstock.

The metals may include, but are not limited to, phosphorus (P), sodium (Na), potassium (K), copper (Cu), iron (Fe), calcium (Ca) and magnesium (Mg), lead (Pb), cadmium (Cd), nickel (Ni), vanadium (V), manganese (Mn), zinc (Zn), etc. Such metals may be present in the feedstock in an amount of from a few parts (e.g., 0.1 ppm) per million by weight (ppm) of feedstock to several thousand ppm (e.g., 5,000 ppm or more) by total weight of feedstock. In certain embodiments, the total metal contaminants may be present in the feedstock in an amount from at least, equal to, and/or between any two of 0.1 ppm, 0.5 ppm, 1 ppm, 2 ppm, 3 ppm, 4 ppm, 5 ppm, 6 ppm, 7 ppm, 8 ppm, 9 ppm, 10 ppm, 15 ppm, 20 ppm, 30 ppm, 40 ppm, 50 ppm, 60 ppm, 70 ppm, 80 ppm, 90 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1200 ppm, 1250 ppm, 1300 ppm, 1350 ppm, 1400 ppm, 1450 ppm, 1500 ppm, 1550 ppm, 1600 ppm, 1650 ppm, 1700 ppm, 1750 ppm, 1800 ppm, 1850 ppm, 1900 ppm, 1950 ppm, 2000 ppm, 2050 ppm, 2100 ppm, 2150 ppm, 2200 ppm, 2200 ppm, 2250 ppm, 2300 ppm, 2350 ppm, 2400 ppm, 2450 ppm, 2500 ppm, 2550 ppm, 2600 ppm, 2650 ppm, 2700 ppm, 2750 ppm, 2800 ppm, 2850 ppm, 2900 ppm, 2950 ppm, 3000 ppm, 3050 ppm, 3100 ppm, 3150 ppm, 3200 ppm, 3200 ppm, 3250 ppm, 3300 ppm, 3350 ppm, 3400 ppm, 3450 ppm, 3500 ppm, 3550 ppm, 3600 ppm, 3650 ppm, 3700 ppm, 3750 ppm, 3800 ppm, 3850 ppm, 3900 ppm, 3950 ppm, 4000 ppm 4050 ppm, 4100 ppm, 4150 ppm, 4200 ppm, 4200 ppm, 4250 ppm, 4300 ppm, 4350 ppm, 4400 ppm, 4450 ppm, 4500 ppm, 4550 ppm, 4600 ppm, 4650 ppm, 4700 ppm, 4750 ppm, 4800 ppm, 4850 ppm, 4900 ppm, 4950 ppm, and 5000 ppm by total weight of the feedstock.

Gums and resins, as wells as carbohydrates and proteins, may make up a few percent by weight of the feedstock (e.g., from 1 wt % to 10 wt %). These undesirable components can cause serious plugging and other detrimental problems within the reactors and processing equipment if not removed or converted prior to processing. In certain embodiments, the total gums and resins may be present in the feedstock in an amount from at least, equal to, and/or between any two of 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, and 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, and 10.0 wt % by total weight of the feedstock.

Referring to FIG. 1, a system 10 for forming products from a fresh or initial non-petroleum or renewable feedstock 12, which may be animal-derived and/or plant-derived fats and/or oils containing oxygen and contaminants of one or more of metals, gums, and resins, is shown. The system 10 includes a treatment system 14 for removing oxygen and undesirable materials including metals, gums, and resins from the feedstock 12 before any hydroprocessing or hydrotreating, such as in a renewable diesel unit.

The feedstock 12 is ultimately heated to a temperature of from 750° F. to 1100° F. in an externally heated tubular reactor 16. The reactor 16 is catalyst free or does not contain or utilize a hydroprocessing catalyst. In certain embodiments, a useful operating or treatment temperature range for the reactor 16 may be from at least, equal to, and/or between any two of 750° F., 755° F., 760° F., 765° F., 770° F., 775° F., 780° F., 785° F., 790° F., 795° F., 800° F., 805° F., 810° F., 815° F., 820° F., 825° F., 830° F., 835° F., 840° F., 845° F., 850° F., 855° F., 860° F., 865° F., 870° F., 875° F., 880° F., 885° F., 890° F., 895° F., 900° F., 905° F., 910° F., 915° F., 920° F., 925° F., 930° F., 935° F., 940° F., 945° F., 950° F., 955° F., 960° F., 965° F., 970° F., 975° F., 980° F., 985° F., 990° F., 995° F., 1000° F., 1005° F., 1010° F., 1015° F., 1020° F., 1025° F., 1030° F., 1035° F., 1040° F., 1045° F., 1050° F., 1055° F., 1060° F., 1065° F., 1070° F., 1075° F., 1080° F., 1085° F., 1090° F., 1095° F., and 1100° F. In the discussion that follows, a temperature of 950° F. for the heating of the feedstock within the reactor 16 may be used for illustrative purposes. The reactor 16 can be a fired heater, electrically heated, steam heated, hot gases, oil heated, etc. The heating can also be that provided as waste heat from other processes.

In some embodiments, one or more optional secondary reactors 18, 20 may be provided with the treatment system 14 that are located downstream and receive the reactor discharge stream 22 from reactor 16, which may be considered a primary reactor. These secondary reactors 18, 20 may be in configured in parallel or series and may be heated or fired reactors, as well, for continued heating of the discharge stream 22 to maintain the elevated reaction temperatures. In other embodiments, the reactors 18, 20 are non-heated, with the reactors 18, 20 merely serving as vessels for increased residence time before cooling, where the reactions can continue to occur from the heated discharge stream 22 from reactor 16. The reactors 16, 18, 20 and their inlets are configured in combination with the fluid flow of the feeds to provide tubular or plug flow through the reactors to eliminate or reduce backflow and back mixing. The primary reactor 16 and secondary reactors 18, 20 may be sized and configured to provide a selected residence time for the introduced feedstock at the selected reactor temperature to ensure that the feedstock is sufficiently reacted before being discharged from the reactors. The residence time within the reactor section of the system 14 is typically on the order of only a few seconds (e.g., 5 seconds or less).

Pressures within the reactors 16, 18, 20 will typically range from 0 psig to 1000 psig. In particular applications, the operating pressure of the reactor(s) may be from at least, equal to, and/or between any two of 0 psig, 10 psig, 20 psig, 30 psig, 40 psig, 50 psig, 60 psig, 80 psig, 90 psig, 100 psig, 110 psig, 120 psig, 130 psig, 140 psig, 150 psig, 160 psig, 170 psig, 180 psig, 190 psig, 200 psig, 210 psig, 230 psig, 240 psig, 250 psig, 260 psig, 270 psig, 280 psig, 290 psig, 300 psig, 310 psig, 320 psig, 330 psig, 340 psig, 350 psig, 360 psig, 370 psig, 380 psig, 390 psig, 400 psig, 410 psig, 420 psig, 430 psig, 440 psig, 450 psig, 460 psig, 470 psig, 480 psig, 490 psig, 500 psig, 510 psig, 520 psig, 530 psig, 540 psig, 550 psig, 560 psig, 570 psig, 580 psig, 590 psig, 600 psig, 610 psig, 620 psig, 630 psig, 640 psig, 650 psig, 660 psig, 670 psig, 680 psig, 690 psig, 700 psig, 710 psig, 720 psig, 730 psig, 740 psig, 750 psig, 760 psig, 770 psig, 780 psig, 790 psig, 800 psig, 810 psig, 820 psig, 830 psig, 840 psig, 850 psig, 860 psig, 870 psig, 880 psig, 890 psig, 900 psig, 910 psig, 920 psig, 930 psig, 940 psig, 950 psig, 960 psig, 970 psig, 980 psig, 990 psig, and 1000 psig.

Reactions within the reactor 16 and reactors 18, 20 occur very fast at the above temperatures, without significant yield loss. All or a majority of the gums and resins react in a thermal cracking reaction within the reactor 16 to form smaller, lower molecular weight components, such as non-condensable gases, naphtha, jet fuel and diesel compounds, which can removed as off-gases or passed through a renewable diesel hydrotreater or other hydroprocessing equipment to make useful products without causing fouling problems. In particular embodiments, the gum and resin content of the initial feedstock can be reduced to from 10% to 100% by weight of the initial gum and resin content of the feedstock 12. In certain embodiments, the gum and resin content of the feedstock 12 can be reduced by an amount of at least, equal to, and/or between any two of 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and 100% by weight of the initial gum and resin content.

In addition, oxygen-containing compounds in the feedstock (e.g., triglycerides, mono- and diglycerides, free fatty acids, etc.) can also react to form water, $CO_2$, CO, and other small, oxygenated compounds. Oxygen present in the feedstock delivered to a renewable diesel unit or other hydroprocessing unit will react with hydrogen to form water. The removal of oxygen in the treatment system 14 prior to such hydroprocessing therefore lowers the hydrogen requirement in the renewable diesel unit or other processing unit downstream. From 10% to 100% of oxygen in the initial feedstock can be removed in the treatment. As an example, at a reaction temperature of 950° F., from 40% to 60% of oxygen can be removed from the feedstock very rapidly. All of the oxygen can be removed at higher temperatures and/or longer reaction times. The triglycerides and mono- and diglycerides of the feedstock 12 also react or "break apart" to form free fatty acids, paraffins, olefins, and other various compounds.

The high-temperature reactor product 24 from the primary tubular reactor 16, and any secondary reactors 18, 20, is cooled to form a cooled reactor product. In certain applications, heat from the high-temperature reactor product 24 is recovered and may be used in heating the feed 26 in a first stage cross-heat exchanger. In the first stage of cross-heat exchange, the feed 26 is used to cool the hot reactor product 24 from reactor 16 and any reactors 18, 20 in heat exchanger 28. The temperature of the hot reactor product 24 will typically be from 750° F. to 1100° F. and will typically be at a temperature that is from 50° F. to 500° F. above that of the feed 26. This typically results in the feed 26 introduced into reactor 16 being heated ($\Delta T$) from 25° F. to 500° F. and the heated product 24 being cooled or dropped in temperature ($\Delta T$) from 25° F. to 500° F. The feed 26 may initially be at a temperature of from 200° F. to 600° F. prior to entering the heat exchanger 28. The heated feedstock 30 discharged from exchanger 28 and introduced into the reactor 16 is typically at a temperature of from 700° F. to 1000° F. Moreover, the reduced-temperature reactor product 32 discharged from the heat exchanger 28 may be at a temperature of from 250° F. to 1000° F. As an example, where the hot reactor product 24 is at 950° F. and the feed 26 is at 650° F., the feed 26 may be heated to approximately 900° F. to form heated feed 30 and the product 24 cooled to a temperature of about 700° F. to form reduced-temperature reactor product 32.

At temperatures where the heated feed 30 is heated at or above 700° F., reactions of the feed 26 begin in the heat exchanger 28 so that it may be considered part of an overall reactor system 34 for treatment of the feedstock. In other embodiments where the feed 30 is not heated at or above 700° F., only the primary reactor 16 and any secondary reactors 18, 20 may be considered part of the overall reactor system 34.

In certain embodiments, a second cross-heat exchanger 36 may be provided for further cooling the reduced-temperature reactor product 32 from the heat exchanger 28 at a ΔT of from 50° F. to 500° F. The heat exchanger 36 may use all or portion of the fresh feedstock 12 to further cool the product 32 to a temperature of from 75° F. to 200° F. This typically results in the initial or fresh feed 12 being heated (ΔT) from 25° F. to 500° F. The temperature of the initial feedstock 12 may vary but can be from room (e.g., 68° F. to 72° F.) or ambient atmospheric temperature (e.g., 0° F. to 100° F.) to 150° F. in some embodiments, which may be heated in the heat exchanger 36 to a temperature of from 200° F. to 650° F. Where the feedstock 12 contains oils or fats that are solid at room temperature, the fresh feedstock 12 may need to be pre-heated above room or ambient temperature so that the oils and fats are in a flowable liquid form. In the example where the reduced-temperature reactor product 32 is at 700° F., the product 32 is cooled further to provide a cooled reactor product 38 having a temperature of about 200° F., with the initial feed 12 being heated to 650° F. to form the feed 26. At temperatures where the fresh feed 12 is heated at or above 700° F. in heat exchanger 36, reactions of the fresh feed 12 begin in the heat exchanger 36 so that it may be considered part of an overall reactor system 34 for treatment of the feedstock.

In some instances, further cooling of the cooled reactor product 38 may be carried out in a further heat exchanger 40 that does not utilize the feedstock 12 as a cooling fluid. The heat exchanger 40 may be used in lieu of or in addition to the heat exchanger 36. The final cooled reactor product 42 will typically be at a temperature of from 100° F. to 200° F.

The final cooled reactor product 42 is then introduced into one or more separators 44. Non-condensable off-gases 46, such as $CO_2$, CO and light hydrocarbons (i.e., $C_1$ to $C_5$ hydrocarbons), that are produced in the reactor system 34 are separated from the cooled reactor product 42. In one example, at a reaction temperature of 950° F., the non-condensable gases may be from 75% to 80% $CO_2$ and some CO, from 1% to 2% methane, from 6% to 8% ethane, from 4% to 6% propane, from 4% to 5% butane, and from 4% to 5% pentane. Carbon dioxide and CO produced in the reaction may reduce the final liquid hydrocarbon product yield. The oxygen lost to these compounds, however, results in lower hydrogen consumption if the product is further hydroprocessed, because it is no longer available to react with the hydrogen to end up as water.

Liquid water 48 is also separated from the liquid hydrocarbon or oil phase of reactor product 42. Metals that have been stripped from the reactor walls of reactor 16 and reactors 18, 20 that are carried in the cooled reactor product 42 are predominantly distributed in the water phase 48 and thus most of the metals are removed with the water 48. Some metals may also be present with the coke formed in the reactors that is carried in the reactor product. The remaining liquid hydrocarbons 50 from separator 44 may then be introduced into a further stripping unit 52 where stripping gases 53 are used to remove additional light off-gases 54 that are separated from the liquid hydrocarbons 56. The non-condensable or off-gas composition, and quantity, is dependent on reaction temperature. Also, the amount of off gas depends on the temperature and pressure of the separator. Higher pressure and lower temperatures in the separators 44, 52 results in less off gas due to the gases remaining in the liquid.

The separated liquid hydrocarbons 56 are introduced into and pressurized in pump 58. The pressurized liquid hydrocarbons 60 are then filtered in filtering unit 62, such as a cartridge filter or sand filter, to remove coke and any remaining metals and other solids to form the final treated product 64.

At the high reaction temperatures, coke formed during the reaction and metals present in the initial feedstock 12 may tend to be deposited on the walls of the reactor 16 and reactors 18, 20. To keep the reactors 16, 18, 20 from coking and plugging from such materials, a high velocity is maintained in the reactor system 34 through a combination of pipe sizing, to keep the velocity high, and the addition of a high velocity oxygen-gas-free gas (i.e., no $O_2$), such as one or more of steam, nitrogen, $CO_2$, hydrogen, etc., to increase the velocity even more. In most instances, the gas will be steam or nitrogen. In particular embodiments, the gas is added with the feedstock to provide a flow velocity of the feedstock within the reactors 16, 18, 20 or reactor tubes of from 20 ft/sec to 100 ft/sec, more particularly from 30 ft/sec to 70 ft/sec, and still more particularly from 20 ft/sec to 50 ft/sec. The high velocity gas may be added to the feed stream 12 and/or 26, as shown at 66 and 68. If added to the heated feed stream 26, the gas may be heated to a temperature around (e.g., ≤50° F. of the feed temperature) or above the temperature of the feed 26 to prevent a significant drop in temperature of the feed 26. In other embodiments, the high velocity gas 66 and/or 68 is not preheated.

This high velocity of the heated feed 30 from heat exchanger 28 that is introduced into reactors 16, 18, 20 results in the walls of the reactors being kept clean due to the erosion of any deposited coke and metals from the walls due to the high velocity fluid flow. The coke and metals thus do not adhere to the reactor walls and are removed and carried in the reactor product streams. The coke and metals carried in the reactor product streams are eventually removed in the water phase 48 and/or through filtration unit 62, as discussed previously.

From 50% to 99% or more up to 100% by weight of metals in the fresh or original feedstock can be removed utilizing the disclosed treatment system and method. More particularly, from 90% to 99% or more by weight of metals in the feedstock can be removed utilizing the disclosed process. In certain embodiments, the metal content of the initial feedstock 12 can be reduced by an amount of at least, equal to, and/or between any two of 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and 100% by weight of the initial metal content.

Figure 2:
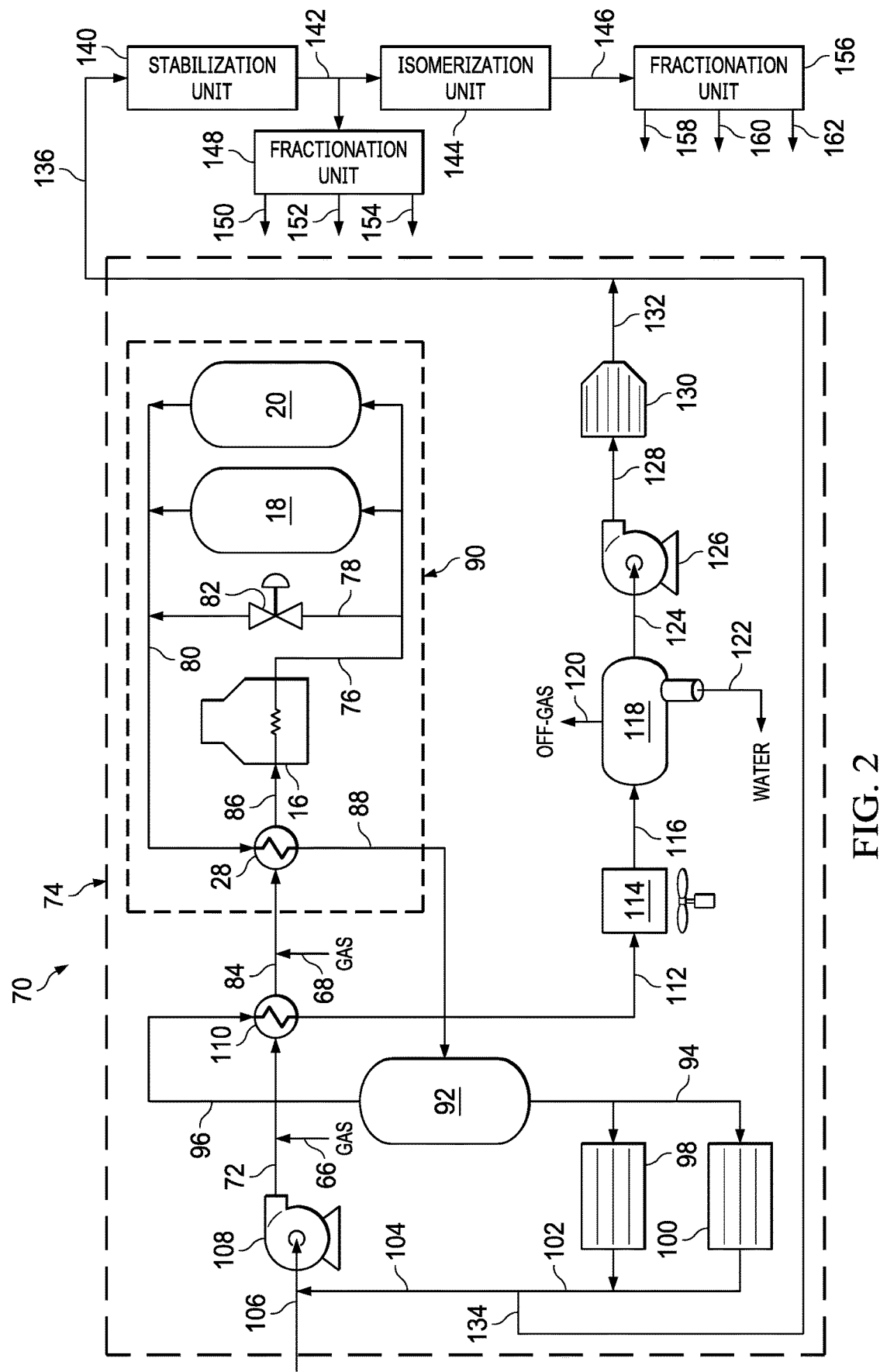
FIG. 2 is a schematic flow diagram of an alternate embodiment of a treatment system for treating a feedstock of animal-derived and/or plant-derived fats and/or oils.

Referring to FIG. 2, another treatment system 70 for forming products from a fresh or initial non-petroleum or renewable feedstock, which may be the same or similar to the feedstock 12. This may include animal-derived and/or plant-derived fats and/or oils containing oxygen and contaminants of one or more of metals, gums, and resins, is shown. The system 70 is similar to the system 10 of FIG. 1, with similar components labeled with the same reference numerals. The system 70 includes a treatment system 74 for removing oxygen and undesirable materials including metals, gums, and resins from a feedstock 72 before any hydroprocessing or hydrotreating, such as in a renewable diesel unit. The system 70 differs from the system 10 in that it utilizes a recycle stream, which may allow better control of the process, as well as facilitate higher removal of oxygen.

In the treatment system 74, the feedstock 72 is ultimately heated to a temperature of from 750° F. to 1100° F., or similar temperatures to those described previously for the system 10, in the externally heated tubular reactor 16. The reactor pressures may also be the same. The reactor 16 of FIG. 2 is also catalyst free or does not contain or utilize a hydroprocessing catalyst.

One or more secondary reactors 18, 20, which may be the same or similar to those of FIG. 1, may also be provided with the treatment system 74 that are located downstream and receive all or a portion of the reactor discharge stream 76 from reactor 16. In the treatment system 74 of FIG. 2, a bypass line 78 is provided for bypassing the secondary reactors 18, 20 and directing all or a portion of the reactor discharge stream 76 to reactor product stream 80. A control valve 82 allows selective control of flow of the reactor product through bypass line 76 so that the amount of product through line 76 can be varied, wherein only a portion (e.g., from 10% to 90%) of the product discharge 76 is directed through bypass line 78, with the remaining reactor product discharge 76 being directed through lines 84, 86 to reactors 18, 20. In some embodiments, the valve 82 may remain closed during operation so that all of the discharge product stream 22 is directed through lines 84, 86 to the secondary reactors 18, 20, respectively. In other instances, all of the product stream 22 may be directed through bypass line 78, with none being delivered to the reactors 18, 20. Although not shown, a similar bypass line may be used with the system 10 of FIG. 1.

In certain applications, heat from the high-temperature reactor product 80 is also recovered and may be used in heating the feed 84 in a first stage cross-heat exchanger. In the first stage of cross-heat exchange, the feed 84 is used to cool the hot reactor product 80 from reactor 16 and any secondary reactors 18, 20 in heat exchanger 28. The temperature of the hot reactor product 24 will typically be from 750° F. to 1100° F. and will typically be at a temperature that is from 50° F. to 500° F. above that of the feed 84. The heated feedstock 86 discharged from exchanger 28 and introduced into the reactor 16 is typically at a temperature of from 700° F. to 1000° F.

As with the treatment system 14 of FIG. 1, at temperatures where the heated feed 86 is heated at or above 700° F., reactions of the feed 84 begin in the heat exchanger 28 so that it may be considered part of an overall reactor system 90 for treatment of the feedstock. In other embodiments where the feed 84 is not heated at or above 700° F., only the primary reactor 16 and any secondary reactors 18, 20 may be considered part of the overall reactor system 90.

Moreover, the reduced-temperature reactor product 88 discharged from the heat exchanger 28 may be at a temperature of from 350° F. to 600° F., where some, but not all, of the reactor product is condensed. The reduced temperature product 88 is typically at temperatures and conditions where water remains in a vapor or superheated state. The reduced-temperature reactor product 88 is then introduced into a first "hot" separator where condensed liquid hydrocarbons from product stream 88 are separated as hot liquid stream 94 from other gases, such as lower boiling point hydrocarbons, steam, and other gases, such as CO, $CO_2$, etc., which are discharged as "hot" gas stream 96.

The separated liquid stream 94 is passed through one or more filter units 98, 100, which may the same or similar to the filter unit 62 of FIG. 1. The filter units 98, 100 may be configured in series or parallel. The filter units 98, 100 are used to filter out coke and any entrained metals and other solids present in the liquids of stream 94 to form filtered liquid stream 102.

A portion (e.g., from 10% to 90%) of the filtered liquid stream 102, is used to form recycle stream 104. The recycle stream 104 is combined with a fresh or initial non-petroleum or renewable feedstock 106, which may be the same or similar to the feedstock 12, previously described. The combined fresh feedstock 106 and recycle stream 104 are delivered to pumping unit 108 where they form feedstock 72, which is a combined feedstock of fresh feedstock and recycled product. Because the recycle stream 104 is at an elevated temperature, this also facilitates heating of the fresh feedstock 106.

If necessary, the combined feedstock 72 may also be passed through a heat exchanger 110. The heat exchanger 110 may be configured as a cross heat exchanger, where the separated "hot" product gas stream 96 from separator 92 is used to heat the combined feedstock 72 to form feed stream 84. Similarly, the combined feed stream 72, which is at a lower temperature than the product gas stream 96, may be used for further cooling the gas stream 96 to form cooled product stream 112, where some, but not all, reactor products may be condensed.

High velocity gas, such as that described with the system 10 of FIG. 1, may also be added to the feed stream 72 and/or 84, as shown at 66 and 68, to keep the reactors 16, 18, 20 free from coking and plugging from metals that would otherwise be deposited on the reactor walls.

Further cooling of the cooled reactor product 112 may be carried out in a further heat exchanger 114 to form cooled reactor product 116. The final cooled reactor product 116 will typically be at a temperature of from 100° F. to 200° F.

The final cooled reactor product 116 is then introduced into one or more separators 118. Non-condensable off-gases 120, such as $CO_2$, CO and light hydrocarbons (i.e., $C_1$ to $C_5$ hydrocarbons), which are produced in the reactor system 90 are separated from the cooled reactor product 116. Liquid water 122 is also separated from the liquid hydrocarbon or oil phase of reactor product 116. Metals that have been stripped from the reactor walls of reactor 16 and reactors 18, 20 that are carried in the cooled reactor product 116 are predominantly distributed in the water phase 122 and thus most of the metals are removed with the water 122. The remaining liquid hydrocarbons 124 are introduced into and pressurized in pump 126. Although not shown, a stripping unit, such as the stripping unit 52 of FIG. 1, may also be used with system 70 to remove additional light gases from the stream 124 before the liquid hydrocarbons are introduced into the pump 126. The pressurized liquid hydrocarbons 128 may then be filtered in filtering unit 130, such as a cartridge filter or sand filter, to remove any coke and remaining metals and other solids in the product stream 128 to form filtered liquid product stream 132.

The portion of the filtered liquid product stream 102 that is not recycled as recycle stream 104 may be combined as liquid product stream 134 with the liquid stream 132 to from the final treated product 136.

The use of the recycle stream 104 in system 70 facilitates further removal of oxygen from the feedstock. For example, where the system 10 is operated under conditions where the oxygen in the feed is reduced by 50%, recycling a portion of the reaction products, such as with recycle stream 104, can result in a further reduction in oxygen under similar reaction conditions. This may result in a 20% to 70% further reduction of the oxygen content of the feedstock, so that the system 70 can remove from 60% to 85% of the oxygen from the feed under the same reaction conditions.

The final treated products 64 and 136 from both treatment systems 10 and 70 of FIGS. 1 and 2, respectively, have unique characteristics. As discussed earlier, the gum and resin content of the initial feedstock is significantly reduced or eliminated entirely, with the gum and resins being converted into useful products or other non-detrimental compounds. In most instances, in the final products, virtually no detectable solids indicating the presence of gums and resins in the final product are found. Moreover, the product can be further processed in the renewable diesel unit without causing problems of plugging.

Metals are also removed so that from 90% to 99.9% to even 100% of the metals in the initial feedstock are removed. The final product may therefore have very little or no metals. If any metals do remain in the final product, such remaining metal contaminants may be present in the final product in an amount from only 0.00001 ppm to 100 ppm by total weight of the product. In certain embodiments, the total metal contaminants may be present in the final product in an amount from at least, equal to, and/or between any two of 0 ppm, 0.00001 ppm, 0.0001 ppm, 0.001 ppm, 0.01 ppm, 0.1 ppm, 0.5 ppm, 1 ppm, 2 ppm, 3 ppm, 4 ppm, 5 ppm, 6 ppm, 7 ppm, 8 ppm, 9 ppm, 10 ppm, 15 ppm, 20 ppm, 30 ppm, 40 ppm, 50 ppm, 60 ppm, 70 ppm, 80 ppm, 90 ppm, and 100 ppm by total weight of the product.

The final products 64, 136 may have a specific gravity of from 0.73 to 0.85, and a viscosity of from 0.5 cSt to 5 cSt. In certain embodiments, the final product may have a specific gravity of from at least, equal to, and/or between any two of 0.73, 0.74, 0.75, 0.76, 0.77, 0.78, 0.79, 0.80, 0.81, 0.82, 0.83, 0.84, and 0.85. And the final product may have a viscosity of from at least, equal to, and/or between any two of 0.5 cSt, 0.6 cSt, 0.7 cSt, 0.8 cSt, 0.9 cSt, 1.0 cSt, 1.1 cSt, 1.2 cSt, 1.3 cSt, 1.4 cSt, 1.5 cSt, 1.6 cSt, 1.7 cSt, 1.8 cSt, 1.9 cSt, 2.0 cSt, 2.1 cSt, 2.2 cSt, 2.3 cSt, 2.4 cSt, 2.5 cSt, 2.6 cSt, 2.7 cSt, 2.8 cSt, 2.9 cSt, 3.0 cSt, 3.1 cSt, 3.2 cSt, 3.3 cSt, 3.4 cSt, 3.5 cSt, 3.6 cSt, 3.7 cSt, 3.8 cSt, 3.9 cSt, 4.0 cSt, 4.1 cSt, 4.2 cSt, 4.3 cSt, 4.4 cSt, 4.5 cSt, 4.6 cSt, 4.7 cSt, 4.8 cSt, 4.9 cSt, and 5.0 cSt The final oxygen content of the final products 64 and 136 from treatment 10 and 70 of FIGS. 1 and 2, respectively, will typically be from 6%, 5%, 4%, 3%, or 2% or less by total weight of the final product. In certain embodiments, the oxygen content may be present in the final products 64, 134 in an amount from at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, and 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, and 10.0 wt % by total weight of the final product.

The final products 64 or 136 may also be composed of from 25 wt %, 20 wt %, 15 wt %, 10 wt %, or 5 wt % or less of any triglycerides, monoglycerides, diglycerides, free fatty acids, phosphatides, sterols, tocopherols, tocotrienols, and fatty alcohols, from 5 wt % to 30 wt % naphtha, 50 wt % or more of diesel, and from 5 wt % or less olefins. In particular embodiments, the total amount of compounds of triglycerides, monoglycerides, diglycerides, free fatty acids, phosphatides, sterols, tocopherols, tocotrienols, and fatty alcohols may be present in the final product in an amount from at least, equal to, and/or between any two of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, and 25 wt % by total weight of the final product.

Naphtha may be present in the final product in an amount from 5 wt % to 30 wt % by total weight of the final products 64 or 136. As used herein, unless otherwise stated, "naphtha" may be generally defined as that hydrocarbon fraction having Reid vapor pressure of 10 psi or less and a final boiling point of 330° F. or less at 1 atmosphere. In certain applications, naphtha may be present in the final products 64 or 136 in an amount from at least, equal to, and/or between any two of 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt % by total weight of the final product.

Renewable jet fuel (i.e., sustainable aviation fuel) may be present in the final product 64 or 136 in an amount of from 5 wt % to 50 wt %. In particular instances, the renewable jet fuel fraction may be present in the final product 64 or 136 from at least, equal to, and/or between any two of 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the final product.

Diesel may be present in the final product 64 or 136 in an amount from 50 wt % or more by total weight of the final product. As used herein, unless otherwise stated, "diesel" may be generally defined as that hydrocarbon fraction having a flash point of below 125° F. with 90% of the composition having a boiling point of 640° F. or less at 1 atmosphere. In some embodiments, diesel may be present in the final product 64 or 136 from at least, equal to, and/or between any two of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, and 90 wt % by total weight of the final product.

Olefins may be present in the final product 64 or 136 in an amount of from 5 wt % or less. In particular instances, olefins may be present in the final product 64 or 136 from at least, equal to, and/or between any two of 0 wt %, 0.1 wt %, 0.2 wt %, 0.3 wt %, 0.4 wt %, 0.5 wt %, 0.6, 0.7, 0.8, 0.9, 1.0, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, and 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, and 5.0 wt % by total weight of the final product.

In many instances, the final products 64 and 136 from each of the treatment systems 10, 70, respectively, may meet the requirements of ASTM D975 for renewable diesel without requiring further processing, such as hydroprocessing or isomerization. In other instances, the final products may undergo hydroprocessing and/or isomerizing, regardless of whether or not it meets the requirements of ASTM D975 for renewable diesel.

In certain instances, the products 64, 136 from either of the systems 10, 70, may be used as a feedstock for further processes. Each of the systems 10, 70 may thus include a further stabilization unit 140 where the products 64, 136 are stabilized to form a stabilized product 142. This may include hydroprocessing, where the stabilization unit 140 includes a reactor containing a hydroprocessing catalyst that is contacted by the products 64, 136 in the presence of hydrogen under conditions suitable for hydroprocessing. As used herein, the term "hydroprocessing," unless stated otherwise or is apparent from the context, is meant to include hydrotreating, hydrofinishing, hydrorefining, hydrocracking, hydroisomerization, and hydrodemetalization. The stabilization unit 140 may be used to remove residual oxygen and/or olefins.

The stabilized product 142 may have a specific gravity of from 0.75 to 0.80, a viscosity of from 0.5 cSt to 2 cSt, and an oxygen content of 0.2 wt % or less. The pour point of the stabilized product may be from 35° F. or less. In certain embodiments, the stabilized product 142 may have a specific gravity of from at least, equal to, and/or between any two of 0.75, 0.74, 0.75, 0.76, 0.77, 0.78, 0.79, and 0.80. And the stabilized product 142 may have a viscosity of from at least, equal to, and/or between any two of 0.5 cSt, 0.6 cSt, 0.7 cSt, 0.8 cSt, 0.9 cSt, 1.0 cSt, 1.1 cSt, 1.2 cSt, 1.3 cSt, 1.4 cSt, 1.5 cSt, 1.6 cSt, 1.7 cSt, 1.8 cSt, 1.9 cSt, and 2.0 cSt.

In certain embodiments, all or a portion of the stabilized product 142 may be delivered to a separate isomerization unit 144, which may be provided with the systems 10, 70, under conditions suitable for isomerizing n-paraffins to iso-paraffins to provide an isomerized product 146 with a selected pour point.

In some embodiments, all or a portion of the stabilized product 142 that has not been isomerized may be directed to a fractionation unit 148 of each of the systems 10, 70, where the product 142 may be fractionated into various products, such as a naphtha fraction 150, a renewable jet fuel fraction 152, and a renewable diesel fraction 154. Similarly, all or a portion of the isomerized product 146 may be sent to a fractionation unit 156 of each of the systems 10, 70, where the isomerized product 146 is fractionated into various products, such as a naphtha fraction 158, a renewable jet fuel fraction 160, and a renewable diesel fraction 162.

While the products 64, 136 may undergo hydroprocessing (stabilization) and/or separate isomerization, as in a conventional renewable diesel process, it should be distinguished from hydroprocessing and isomerization that are utilized in conventional renewable diesel processing systems.

Because the product from the treatment systems 10, 70 has a significantly lower oxygen content than conventional renewable diesel feedstocks, the amount of hydrogen necessary for hydroprocessing is significantly lower. For example, in a conventional renewable diesel hydrotreating system, a typical amount of hydrogen gas ($H_2$) necessary for a given feedstock may be around from 1,500 scf/bbl to 4,000 scf/bbl. Utilizing the products 64, 136 derived from the same initial feedstock as a feedstock for hydroprocessing, the amount of hydrogen gas required may be reduced from 30% to 90%. Thus, for example, while 3000 scf/bbl of hydrogen gas may be needed for treating a given feedstock in a conventional renewable diesel unit, the amount of hydrogen gas needed for stabilizing the products 64, 136 derived from the same initial feedstock may be from 300 scf/bbl to 1500 scf/bbl to form a similar or comparable product. Additionally, the operating pressure for hydroprocessing in a conventional renewable diesel unit may be much higher, at around 900 psi or more. To form a comparable product utilizing the treated initial feedstock in the stabilization unit 140, the operating pressure may be around 300 psi. Because plant costs increase linearly with respect to operating pressure, reducing the operating pressure for a given process can lower the plant construction costs considerably.

In some embodiments, the stabilization unit 140 used for hydroprocessing the products 64, 136 may be a liquid-phase hydroprocessing reactor system that utilizes a liquid diluent combined with the feedstock for dissolving the necessary hydrogen for reaction. Such hydroprocessing systems and methods are described in U.S. Pat. Nos. 9,096,804; 9,828, 552; 10,487,268; 10,961,463 and 10,981,142, each of which is hereby incorporated herein by reference in its entirety for all purposes. Alternatively, the stabilization unit 140 can be configured as a conventional hydroprocessing unit, similar to a conventional renewable diesel unit, where large volumes of hydrogen gas are circulated in the reactor along with the feedstock. In contrast to conventional hydroprocessing or hydrotreating units, the stabilization unit 140 will typically require significantly less hydrogen and significantly lower reactor pressures than conventional processing equipment.

Additionally, because most of the oxygen is removed from the products 64, 136, less water is produced in the stabilization unit 140 so there is no danger of water damage to the hydroprocessing catalyst or the creation of a separate water phase.

With respect to isomerization, the products from conventional renewal diesel plants typically contain a significant amount of waxes or n-paraffins and may, for example, have a cloud point of around 70° F. Given the same initial feedstocks, the products 142 of treatment systems 10 and 70 hydrotreated in the stabilization unit 140 are significantly different from those hydrotreated in a conventional renewable diesel unit. Even after hydrotreating in the stabilization unit 140, there are fewer waxes or n-paraffins in the stabilized product 142. The stabilized product 142 will typically have a cloud point of from 35° F., 30 F, 25, 20° F., or 15° F. or less without any isomerization treatment. This is considerably lower than the hydrotreated product from a conventional renewable diesel unit.

One of the advantages of the treatment method and systems 10, 70 is to help in lowering GHG emissions. Not only do the methods and systems utilize a renewable feedstock, which has a lower environmental impact, but assuming the feedstocks received by the systems 10, 70 have a CI score of zero, the stabilized products 142 produced from the systems 10, 70 meet the criteria of renewable diesel but will have a CI score of 10 g/MJ or less, as established by the criteria of California LCFS of 2018. This is based upon natural gas fuel usage for the reactors 16, 18, 20 and power consumption for the various powered equipment utilized to operate the systems 10, 70. Power consumption for calculating the CI value includes the power used to operate pumping units for the initial feedstock (e.g., pump 108), pumping units for the product (e.g., pumping units 58, 126), and forced convection heat exchangers (e.g., heating exchangers 40, 114). The hot reaction product of the system facilitates heating of the renewable feedstock, and the renewable feedstock facilitates cooling of the hot reaction products. And using combustible off-gases as fuel for the systems 10, 70 helps to reduce CI further. In certain embodiments, the stabilized products 142 will have a CI score of 10 g/MJ, 9 g/MJ, 8 g/MJ, 7 g/MJ, 6 g/MJ, 5 g/MJ, 4 g/MJ, or 3 g/MJ or less. This is contrasted with conventional renewable diesel products that, even assuming a feedstock with an initial CI score of zero, will still typically have a CI of around 20 g/MJ.

The following examples serve to further illustrate various embodiments and applications.

EXAMPLES

Example 1

Tank bottoms from distiller's corn oil having high gums, resins, water and metals content was treated at 600 psig and 900° F. through a fired heater for a period of a few seconds in a laboratory pilot plant. The treated product was cooled to separate the water and off-gas from the hydrocarbon phase. The final product contained trace amounts of water, 4 wt % off-gas and 96 vol % hydrocarbon liquids. The hydrocarbon liquids contained 19 vol % naphtha and 77 vol % percent diesel relative to the feed.

While the invention has been shown in only some of its forms, it should be apparent to those skilled in the art that it is not so limited but is susceptible to various changes and modifications without departing from the scope of the invention. Accordingly, it is appropriate that the invention be construed broadly.

We claim:

1. A system for treating non-petroleum or renewable feedstocks containing oxygen and contaminants of one or more of metals, gums, and resins, the system comprising:
   a reactor having a heat source for heating an interior of the reactor, the reactor being configured to receive a feedstock of a non-petroleum or renewable feedstock containing oxygen or contaminants of one or more of metals gums, and resins at a flow velocity of from 20 ft/sec to 100 ft/sec within the interior to facilitate heating the feedstock to a temperature of from 700° F. to 1100° F. to form a reactor product having one or more of gums and resins in the fats and/or oils of the feedstock removed and/or reduced;
   a first heat exchanger configured to cool at least a portion of the reactor product to an intermediate reduced temperature to facilitate forming an intermediate cooled reactor product; and
   a first separator unit configured for separating gases and liquids from the intermediate cooled reactor product to facilitate forming a separated liquid and a separated gas, the first separator unit having a separated liquid discharge that is in fluid communication with the reactor so that the separated liquid is introduced as recycle into the reactor along with the feedstock;
   a second heat exchanger configured to receive the separated gases from the first separator unit to cool the separated gases to a temperature of 250° F. or less to form a cooled reactor product; and
   a second separator unit configured to separate and remove non-condensable gases, metals and water from the cooled reactor product to form a final product.

2. The system of claim 1, wherein:
the reactor is a tubular or plug flow reactor.

3. The system of claim 1, wherein:
the reactor constitutes a primary reactor; and further comprising
at least one secondary reactor for receiving a reactor discharge from the primary reactor, the primary reactor and the at least one secondary reactor facilitate forming the reactor product.

4. The system of claim 3, further comprising:
a bypass line for selectively directing at least a portion of the reactor discharge stream as the reactor product from the primary reactor directly to an intermediate heat exchanger bypassing the at least one secondary reactor.

5. The system of claim 1, further comprising:
a filter unit configured to separate solids present in the separated liquid from the second separator before the separated liquids are introduced into the reactor as recycle.

6. The system of claim 1, further comprising:
a hydroprocessing unit that receives the final product and is configured to form a hydroprocessed product from the final product.

7. The system of claim 6, further comprising:
the hydroprocessing unit is a liquid phase hydroprocessing unit.

8. The system of claim 6, further comprising:
a fractionation unit that receives the hydroprocessed product and is configured to form a fractionated product from the hydroprocessed product.

9. The system of claim 1, further comprising:
a stabilization unit that receives the final product and is configured to form a stabilized product from the final product.

10. The system of claim 9, further comprising:
a fractionation unit that receives the stabilized product and is configured for forming a fractionated product from the stabilized product.

11. The system of claim 9, further comprising:
an isomerizing unit that receives the stabilized product and is configured to form an isomerized product from the stabilized product.

12. The system of claim 1, further comprising:
an isomerizing unit that receives the final product and is configured to form an isomerized product from the final product.

13. The system of claim 1, wherein:
the second separator unit is composed of two or more separator units to separate and remove non-condensable gases, metals and water from the cooled reactor product to form the final product.

14. The system of claim 1, further comprising:
a pump for pressurizing the final product.

15. The system of claim 14, further comprising:
a filter unit configured for receiving the pressurized final product from the pump and removing solids from the final product.

16. The system of claim 14, further comprising:
a stripping unit located upstream from the pump that is configured for removing light gases from the final product before the final product is delivered to the pump.

17. A system for treating non-petroleum or renewable feedstocks containing oxygen and contaminants of one or more of metals, gums, and resins, the system comprising:
a tubular or plug flow reactor having a heat source for heating an interior of the reactor, the reactor being configured to receive a feedstock of a non-petroleum or renewable feedstock containing oxygen or contaminants of one or more of metals gums, and resins at a flow velocity of from 20 ft/sec to 100 ft/sec within the interior to facilitate heating the feedstock to a temperature of from 700° F. to 1100° F. to form a reactor product having one or more of gums and resins in the fats and/or oils of the feedstock removed and/or reduced;

at least one secondary reactor for receiving a reactor discharge stream from the tubular or plug flow reactor, the tubular or plug flow reactor and the at least one secondary reactor facilitate forming the reactor product;

a first heat exchanger configured to cool at least a portion of the reactor product to an intermediate reduced temperature to facilitate forming an intermediate cooled reactor product; and a first separator unit configured for separating gases and liquids from the intermediate cooled reactor product to facilitate forming a separated liquid and a separated gas, the first separator unit having a separated liquid discharge that is in fluid communication with the reactor so that the separated liquid is introduced as recycle into the reactor along with the feedstock;

a second heat exchanger configured to receive the separated gases from the first separator unit to cool the separated gases to a temperature of 250° F. or less to form a cooled reactor product; and a second separator unit configured to separate and remove non-condensable gases, metals and water from the cooled reactor product to form a final product.

18. The system of claim 17, further comprising:
a hydroprocessing unit that receives the final product and is configured to form a hydroprocessed product from the final product.

19. The system of claim 17, further comprising:
a stabilization unit that receives the final product and is configured to form a stabilized product from the final product.

20. The system of claim 17, further comprising:
an isomerizing unit that receives the final product and is configured to form an isomerized product from the final product.

* * * * *